US010065563B2

(12) United States Patent
Cornelius et al.

(10) Patent No.: US 10,065,563 B2
(45) Date of Patent: Sep. 4, 2018

(54) LIGHT EMITTING DIODE FAILURE DETECTION SYSTEM FOR A VEHICLE

(71) Applicants: Kevin Cornelius, Lees Summit, MO (US); Scott Troutman, Jamestown, NY (US)

(72) Inventors: Kevin Cornelius, Lees Summit, MO (US); Scott Troutman, Jamestown, NY (US)

(73) Assignee: Truck-lite Co. LLC, Falconer, NY (US)

( * ) Notice: Subject to any disclaimer, the term of this patent is extended or adjusted under 35 U.S.C. 154(b) by 15 days.

(21) Appl. No.: 14/855,842

(22) Filed: Sep. 16, 2015

(65) Prior Publication Data

US 2017/0072854 A1    Mar. 16, 2017

(51) Int. Cl.
*B60Q 11/00*    (2006.01)
*H05B 37/03*    (2006.01)

(52) U.S. Cl.
CPC ........... *B60Q 11/005* (2013.01); *H05B 37/03* (2013.01)

(58) Field of Classification Search
CPC ...... B60Q 11/005; H05B 37/03; H05B 33/83; H05B 33/89; H05B 33/887; H05B 33/893; H05B 33/815; G08B 21/182; G08B 21/185
USPC ....... 340/449, 501, 870.17, 636.18; 700/153, 700/205, 299; 73/204.19; 315/185 R, 315/119, 129, 117, 125, 294, 192, 310, 315/77, 121
See application file for complete search history.

(56) References Cited

U.S. PATENT DOCUMENTS

| 4,745,339 | A | 5/1988 | Izawa |
| 6,218,952 | B1 | 4/2001 | Borland et al. |
| 6,392,364 | B1 | 5/2002 | Yamamoto et al. |
| 6,490,512 | B1 | 12/2002 | Niggemann |
| 6,674,288 | B2 | 1/2004 | Gumbel et al. |
| 6,788,195 | B1 * | 9/2004 | Stegman .............. B60Q 11/005 307/10.8 |

(Continued)

FOREIGN PATENT DOCUMENTS

| EP | 1744602 A2 | 1/2007 |
| EP | 1830607 A1 | 9/2007 |

(Continued)

*Primary Examiner* — Hoi Lau
(74) *Attorney, Agent, or Firm* — The Bilicki Law Firm, P.C.

(57) ABSTRACT

A light failure detection system for use in a vehicle having a plurality of light emitting diode lighting devices includes a plurality of voltage level monitoring circuits and plurality of current monitoring circuits for measuring the voltage and current draw of a plurality of lighting circuits. A voltage drop circuit enabling the plurality of voltage level monitoring circuits and the plurality of current monitoring circuits to measure current and voltage at an adjusted input voltage is also provided. The system a learn mode for monitoring the lighting circuits with the plurality of voltage level monitoring circuits and the plurality of current monitoring circuits to determine threshold voltage and current levels for the lighting circuits. An adjusted threshold current, based on a voltage sensitivity and a sensed temperature, is calculated and a fault is indicated when a measured current is above or below the adjusted threshold current by a predetermined value.

11 Claims, 6 Drawing Sheets

(56) References Cited

U.S. PATENT DOCUMENTS

| | | | |
|---|---|---|---|
| 7,042,165 B2 * | 5/2006 | Madhani | B60Q 1/30 |
| | | | 315/185 R |
| 7,046,132 B2 | 5/2006 | Carpenter | |
| 7,429,917 B2 | 9/2008 | Fredericks et al. | |
| 7,430,464 B2 | 9/2008 | Bell et al. | |
| 7,528,553 B2 | 5/2009 | Ito et al. | |
| 7,876,103 B2 * | 1/2011 | Mihai | H05B 33/089 |
| | | | 315/129 |
| 7,904,260 B2 | 3/2011 | Burlak et al. | |
| 8,334,662 B2 | 12/2012 | Jin et al. | |
| 8,471,498 B2 * | 6/2013 | Aboulnaga | H02M 1/32 |
| | | | 315/185 R |
| 8,503,145 B2 * | 8/2013 | Hulett | H05B 33/089 |
| | | | 315/294 |
| 8,633,813 B2 | 1/2014 | Shank et al. | |
| 8,635,035 B2 | 1/2014 | De Otto | |
| 8,653,539 B2 | 2/2014 | Tischler et al. | |
| 8,749,142 B2 | 6/2014 | Nguyen et al. | |
| 8,816,697 B2 | 8/2014 | Miller et al. | |
| 8,964,431 B2 | 2/2015 | Sato et al. | |
| 9,073,446 B2 | 7/2015 | Brown et al. | |
| 9,103,521 B2 | 8/2015 | Nishitani et al. | |
| 9,434,308 B2 | 9/2016 | Bean | |
| 2006/0139942 A1 | 6/2006 | Pond et al. | |
| 2007/0108843 A1 * | 5/2007 | Preston | H05B 33/083 |
| | | | 307/112 |
| 2008/0231198 A1 * | 9/2008 | Zarr | H05B 33/089 |
| | | | 315/119 |
| 2011/0169424 A1 * | 7/2011 | Aboulnaga | H05B 33/0887 |
| | | | 315/297 |
| 2011/0169447 A1 * | 7/2011 | Brown | B60L 3/0069 |
| | | | 320/109 |
| 2011/0193484 A1 | 8/2011 | Harbers et al. | |
| 2012/0098430 A1 * | 4/2012 | Inoue | H05B 33/0893 |
| | | | 315/82 |
| 2012/0161633 A1 * | 6/2012 | Nishitani | F21V 23/007 |
| | | | 315/117 |
| 2012/0218790 A1 | 6/2012 | Sato et al. | |
| 2012/0187847 A1 * | 7/2012 | Hamamoto | H05B 33/0815 |
| | | | 315/125 |
| 2014/0097761 A1 * | 4/2014 | Chen | H05B 33/0893 |
| | | | 315/192 |
| 2014/0139143 A1 * | 5/2014 | Navabi-Shirazi | |
| | | | H05B 33/0887 |
| | | | 315/310 |
| 2015/0015143 A1 * | 1/2015 | Inada | H05B 33/0815 |
| | | | 315/77 |
| 2015/0102726 A1 * | 4/2015 | Yoneoka | H05B 33/0848 |
| | | | 315/121 |
| 2015/0137679 A1 * | 5/2015 | Gary | B60Q 3/00 |
| | | | 315/77 |

FOREIGN PATENT DOCUMENTS

| | | |
|---|---|---|
| GB | 2511095 A | 8/2014 |
| WO | WO 2012077013 A3 | 8/2012 |

\* cited by examiner

LIGHT EMITTING DIODE FAILURE DETECTION SYSTEM FOR A VEHICLE

FIELD OF THE INVENTION

The present application is directed to a method and system for detecting failure of a lighting device in a vehicle having a marker or tail lamp, a stop lamp, a left turn signal and a right turn signal.

BRIEF SUMMARY

Figure 1:
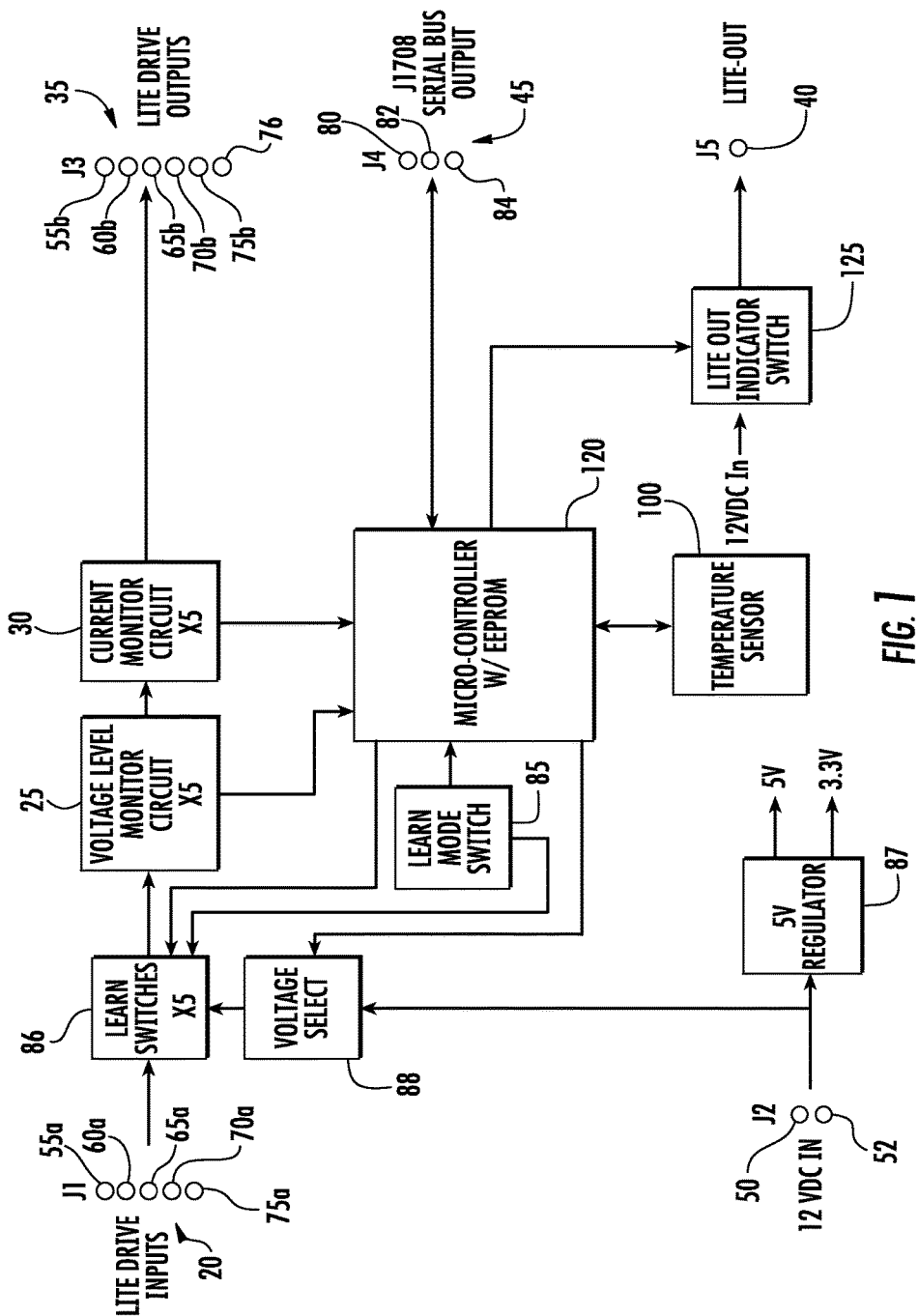
FIG. 1 is a block diagram of a light failure detection system.

A light failure detection system for use in a vehicle having a plurality of light emitting diode lighting devices includes a circuit board and a plurality of lighting circuits being coupled to the circuit board by an input wire. The system further includes a plurality of voltage level monitoring circuits on the circuit board, each one of the plurality of voltage level monitoring circuits connected to one of the lighting circuits and adapted to measure the voltage of the one of the light circuits. A plurality of current monitoring circuits is also provided on the circuit board, each one of the plurality of current monitoring circuits connected to one of the lighting circuits and being adapted to measure a current draw of the respective light circuit. A voltage drop circuit enables the plurality of voltage level monitoring circuits and the plurality of current monitoring circuits to measure current and voltage at an adjusted input voltage.

The system includes learn mode switch for placing the light failure detection system into a learn mode for monitoring the lighting circuits with the plurality of voltage level monitoring circuits and the plurality of current monitoring circuits to determine threshold voltage and current levels for the lighting circuits. A microcontroller is coupled to the circuit board for storing the threshold voltage and current levels and a temperature sensed by a temperature sensor. The microcontroller is adapted to calculate an adjusted threshold current based on a voltage sensitivity and the sensed temperature. A fault indicator is also included for indicating a status of the light failure detection system when a measured current is above or below the adjusted threshold current by a predetermined value.

In addition, a method of detecting a failure of a light emitting diode lighting device in a vehicle having a failure detection system is disclosed. The method includes activating a learn mode, measuring a current (c_ref) and a voltage (v_ref) of a plurality of lighting circuits at an input voltage, measuring a system temperature (t_ref) and deactivating the learn mode. The method also includes measuring at least one light drive input current (c_now) and voltage (v_now) in a normal mode, measuring the system temperature in a normal mode and calculating an adjusted threshold current value based on voltage sensitivity and system temperature (t_ref). It is then determined if the measured light drive input current is below or above the adjusted threshold current value by a predetermined value and displaying an indication of light failure if the measured current is below or above the adjusted threshold current value by the predetermined value.

The Light failure detection system 10 detects failure of 12V lamps in a vehicle lighting system. In particular, light-out detection system 10 detects the voltage level and current flow in various lighting circuits. The detection of low or high current draw indicates the loss of lamp functionality. This lamp loss is indicated to the operator via an indicator output that can be used to drive an LED or other type of indicator.

DETAILED DESCRIPTION OF THE INVENTION

FIG. 1 is a block diagram of a light failure detection system that accepts five (5) Lite Drive Inputs 20, monitors the current 25 and voltage levels 30 on each circuit and passes these inputs to output ports 35. The voltage and current levels on each lighting circuit are monitored and used to make a "Light failure" determination for each of the five circuits. The Light failure detection is indicated to the operator using the Light failure signal or lit-out output 40. In some embodiments, a J1708 serial bus output 45 may be used. The detailed system requirements are described below.

The power input for Light failure system 10 will use 12 VDC power supplied by the vehicle to power the Light failure detection electronics. This 12 VDC bus voltage will be supplied to the onboard power regulators which will provide the regulated voltage needed by the system electronics. Plated PCB holes will allow attachment of pigtail wires that will make connection to the 12 VDC vehicle power source. Two wires will be provided for these inputs: (1) 12 VDC Vehicle Power: Blue Wire 50; and (2) Vehicle Ground: White Wire 52. The operating range of the input voltage range is between about 11.5V to 14.4V. The Light failure detection will require about 200 mA from the 12V bus to power all of the Light failure system circuitry.

The Light failure system includes 5 lighting circuits having discrete wire "Light Drive" inputs. The wires are typically 12 GA wires that are capable of handling 15 Amps. Plated printed circuit board (PCB) holes will allow attachment of the pigtail wires for the vehicle lighting circuit inputs. Terminals on the wires may be used to connect the wires to the PCB. In the embodiment shown, the lighting circuits include Light Drive inputs: Light Circuit 1 Input: Red Wire (Stop) 55a, Light Circuit 2 Input: Black Wire (Marker—Running) 60a, Light Circuit 3 Input: Brown Wire (Clearance—Running) 65a, Light Circuit 4 Input: Yellow Wire (Left Turn) 70a, and Light Circuit 5 Input: Green Wire (Right Turn) 75a. These inputs are referenced to the Vehicle Ground wire (White Wire) 52.

The lighting circuits also include five discrete wire outputs. Plated PCB holes will allow attachment of pigtail wires that will make connection to the vehicle lighting circuit outputs. Five PCB holes accommodate the drive outputs for the vehicle lighting circuits. These circuits are typically capable of handling 15 Amps per circuit. These output connections are fed from the Lite Drive Inputs 20. The lighting circuit outputs are: Light Circuit 1 Output: Red Wire (Stop) 55b, Light Circuit 2 Output: Black Wire (Marker—Running) 60b, Light Circuit 3 Output: Brown Wire (Clearance—Running) 65b, Light Circuit 4 Output: Yellow Wire (Left Turn) 70b, Light Circuit 5 Output: Green Wire (Right Turn) 75b, and Vehicle ground Output: White Wire 76. Alternatively, ground may be picked up via a jumper wire outside the module.

Figure 4:
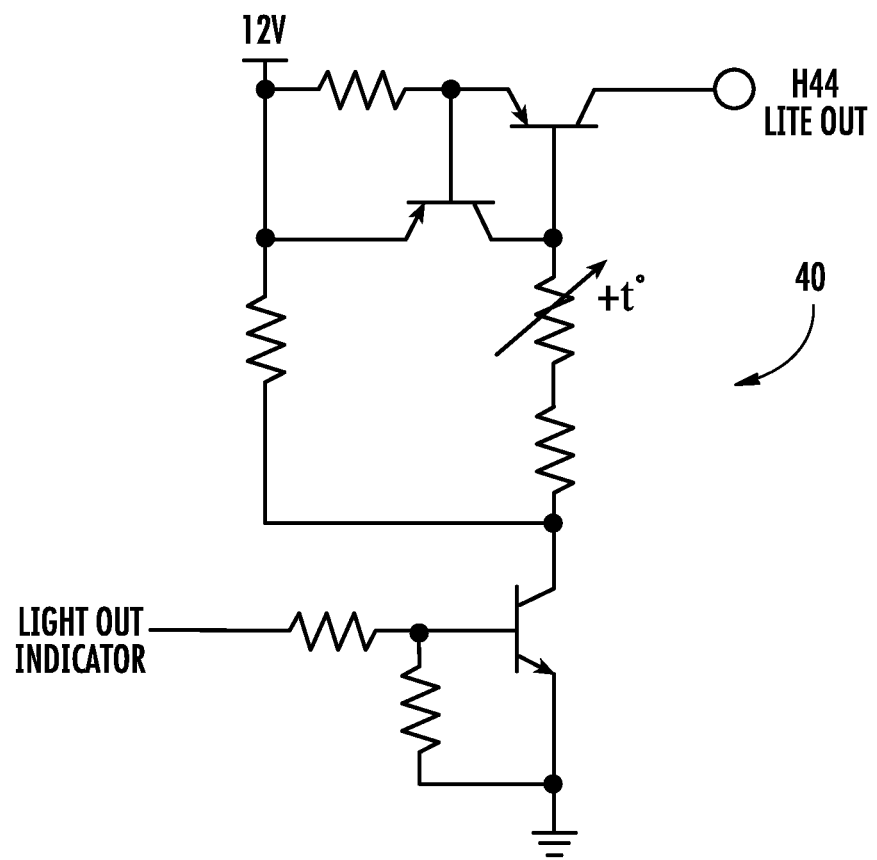
FIG. 4 is a diagram of the light failure switch of the light failure detection system.

The system includes a single wire light failure indicator output 40, as also shown in FIG. 4. An abnormally low or high current level in any of the Light Drive inputs 20 will generate a 12 VDC level on the "Light failure Indicator" signal line. If no alarm is present then this alarm output will be 0V. The Light failure signal will be equipped with a current limit function that will limit the current sourced to the indicator device (LED, buzzer, etc.) to about 200 mA. This current limiting function is implemented using analog circuitry to provide immediate (less than 1 microseconds) response to short circuit conditions.

In one embodiment, the Light failure system also includes a J1708 compatible serial bus output, generally indicated at 45. A 2-wire bus will be made available via 3 wire connections including a ground reference. These wire output signals are summarized as follows: J1708 Data +: Black w/White Stripe Wire 80, J1708 Data −: White w/Red Stripe Wire 82, and Vehicle Ground: White Wire 84.

The Light failure system also includes a push-button or toggle, momentary on-off learn mode activator 85 that is accessible by an operator. Activator 85 allows an operator to place the unit into Learn Mode by activating a plurality of switches 86. Pressing the Learn Mode switch 85 a second time will cause the unit to exit Learn Mode. In one embodiment, the Learn Mode will automatically exit upon completion of cycling through the set circuit combinations.

Figure 2:
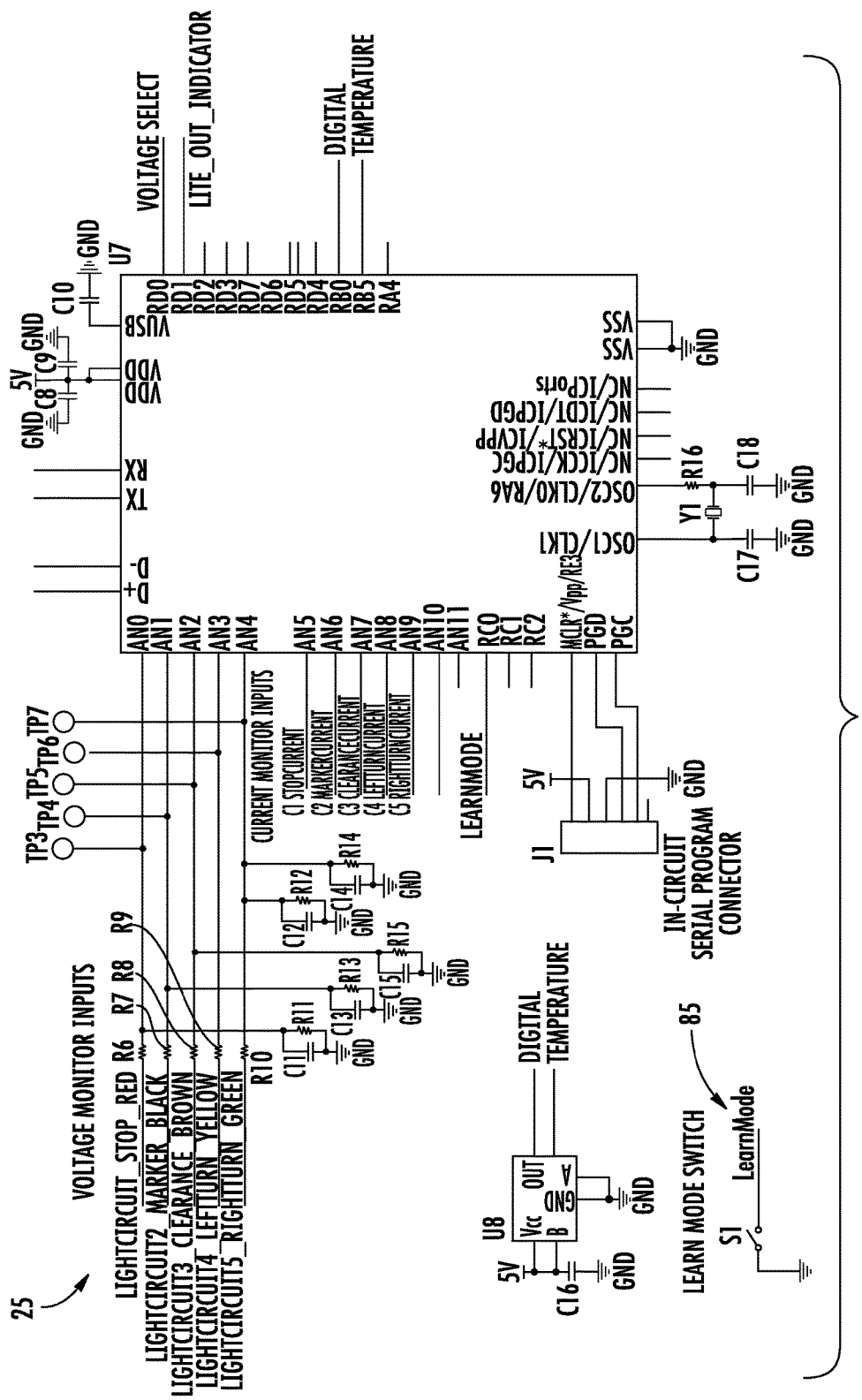
FIG. 2 is a circuit diagram of the voltage monitoring circuits of the light failure detection system.

Light failure system 10 is also equipped with a voltage regulator system 87 for converting the 12V input supply voltage to supply levels required by the Light failure electronics. For example, these levels may be 5.0V and 3.3V. A voltage select or voltage drop circuit 88 is also provided to allow the current and voltage of lighting circuits to be measured at normal and reduced input voltages. In addition, voltage on each Light Circuit is measured using a sampling circuit 25 that draws no more than 0.2 mA from each input. The voltage monitoring will be done using a 12 bit A/D converter that will provide a resolution of approximately 12.5V/4096 counts=3 mVolts/count. The voltage monitoring circuit is shown in FIG. 2.

Figure 3:
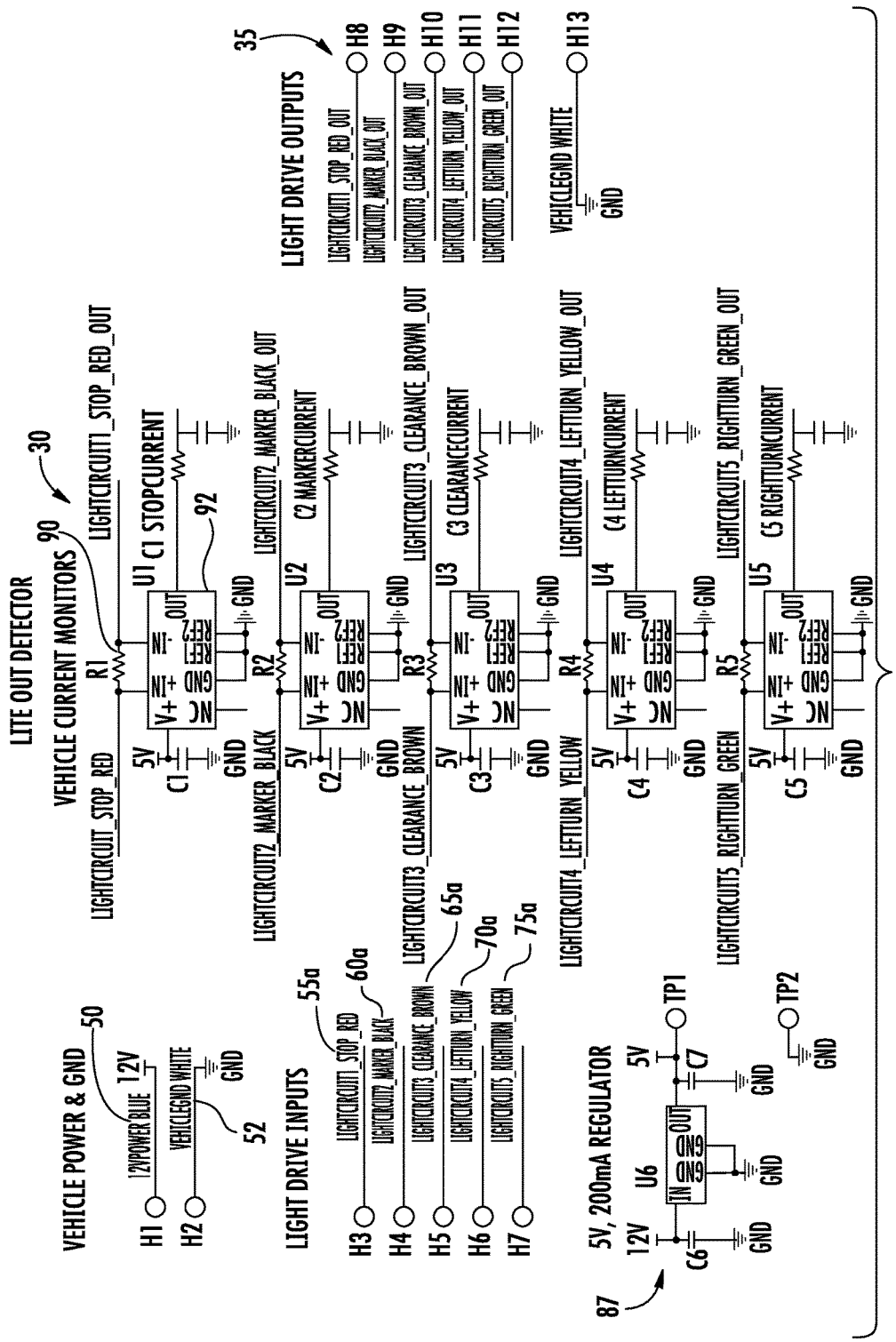
FIG. 3 is a circuit diagram of the current monitoring circuits of the light failure detection system.

Further, Light failure system 10 measures the current draw on each Light Circuit using an OP-Amp based sampling circuit 30, as shown in FIG. 3. Current monitoring is performed using a 0.01 ohm monitoring resistor 90 in series with each Light Drive signal line. At 15 A current levels, resistor 90 has a maximum voltage drop of 0.15 Volts. With a 40 A short circuit current level, resistor 90 has a maximum voltage drop of 0.40 Volts (no more than 0.25 second duration). The voltage across the current monitoring resistor 90 will be monitored using an OP-Amp circuit 92 that will draw no more than 0.2 mA from each Light failure circuit. The OP-Amp circuit 30 will provide a conditioned input to a 12 bit A/D converter that will provide a resolution of approximately 15 A/4096 counts=3.7 mA/count. This resolution assumes a 15 A maximum current draw in each circuit.

The Light failure system includes a fault indicator light 97 for indicating the status of the failure detection system. For example, in learn mode the fault indicator light will solidly illuminate. Upon completion of the Learn Mode the fault indicator light will go out. If there is a failed Learn Mode, then the indicator light will rapidly flash until the Learn Mode is reactivated and a complete Learn Mode is achieved.

A faulted Learn Mode could include, but is not limited to: a short circuit, one of the circuits being on when Learn Mode was initiated, etc. All circuits are off during the Learn Mode since the Learn Mode will cycle through each of the combinations using the Auxiliary Power (BLUE) circuit to power the individual circuits to gather the current draw data for the microprocessor. For example, fault light indicator may display the following: Learn Mode—Continuous flashes—1 second on, 1 second off; Light Circuit 1 Fault—1 quick flash, 1 second off; Light Circuit 2 Fault—2 quick flashes, 1 second off; Light Circuit 3 Fault—3 quick flashes, 1 second off; Light Circuit 4 Fault—4 quick flashes, 1 second off; and Light Circuit 5 Fault—5 quick flashes, 1 second off.

A temperature sensor 100 is also included for providing a temperature measurement from −55° C.~125° C. with a minimum of 1° C. accuracy. Temperature sensor 100 will be used by the control electronics to adjust the expected operational lamp current (Normal Light Drive Current Level) for temperature effects.

Light drive inputs 20 and light drive outputs 35 connect to a printed circuit board assembly using wires with terminals, such as 12 GA wires. In one example, light failure system 10 may use printed circuit board such as a standard green FR4, 0.062" thick, 4 layer PCB assembly. However, other circuit boards may be used.

Figure 5A:
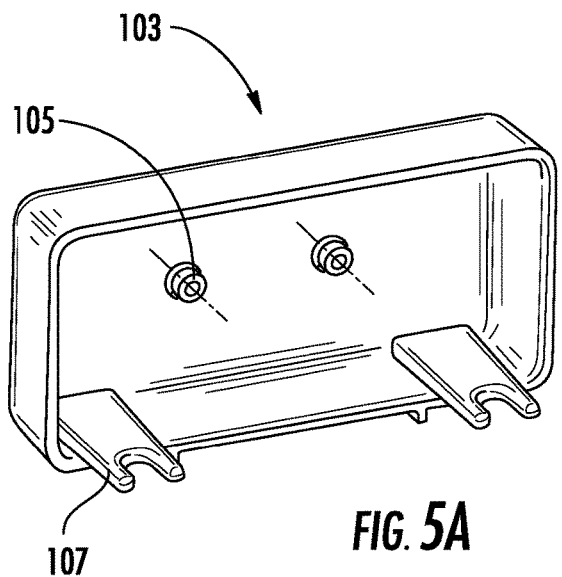
FIG. 5A is a back perspective view of a mechanical enclosure of the light failure detection system.
Figure 5B:
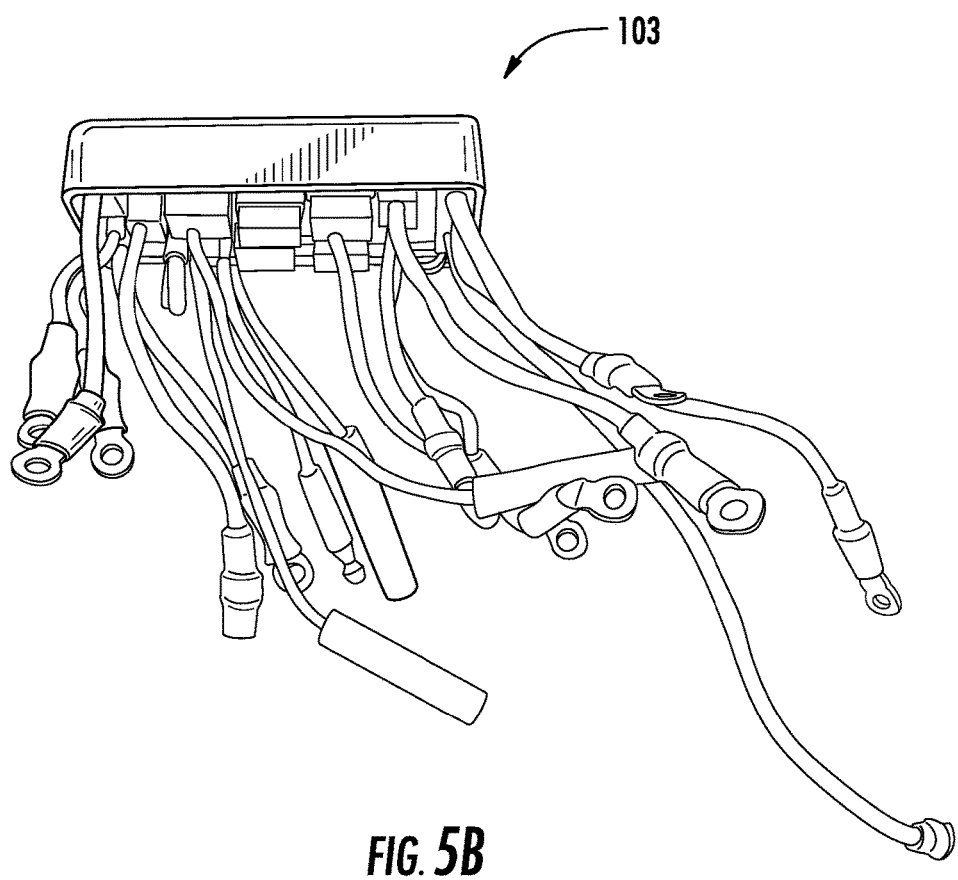
FIG. 5B is a back view of the light failure detection system with a mechanical enclosure.

Further, Light failure system 10 includes a mechanical enclosure for housing the Light failure system electronics. One embodiment of a mechanical enclosure 103 is shown in FIGS. 5A-5B. Mechanical enclosure 103 includes holes 105 for receiving fasteners and projections 107 for facilitating attachment of light out system 10 to a vehicle. Mechanical enclosure 103 is formed of a thermoplastic polymer such as Acrylonitrile butadiene styrene (ABS). Further, for example, the mechanical enclosure 103 may a width of about 4-5 inches, a height of about 1-2 inches and a depth of about 0.5 to 1 inch.

A potting compound may be used to fill mechanical enclosure 103 following the installation of a circuit board and wires. The pigtail wires are installed prior to potting. The potting compound prevents visual and physical inspection of the Light failure electronics assembly and protects the circuitry from the elements.

Light failure system 10 includes a learn mode that is activated by a switch 85, such as a push-button or toggle switch that allow the vehicle operator to place light out system 10 in Learn Mode. In the learn mode the fault indicator light will solidly illuminate. Upon completion of the Learn Mode the fault indicator light will go out. If there is a failed Learn Mode, then the indicator light will rapidly flash until the Learn Mode is reactivated and a complete Learn Mode is achieved. A faulted Learn Mode could include, but is not limited to, a short circuit, one of the circuits is on when Learn Mode was initiated, etc. It is important to have all circuits off when in Learn Mode since the Learn Mode will cycle through each of the combinations using the Auxiliary Power (BLUE) circuit to power the individual circuits to gather the current draw data for the microprocessor. The Learn Mode will use the Auxiliary Power circuit (BLUE) to systematically power all 31 combinations of the five Light Drive lines to monitor and record the maximum voltage and current levels on the Light Drive lines. The current levels are stored in the EEPROM in the microcontroller. The light failure indicator is on during the Learn Mode and goes out upon successful completion of the Learn Mode. The Learn Mode will deactivate on its own following the completion of a successful Learn Mode cycle. At that time the fault indicator lamp will turn off.

In operational mode, Light failure Detection System 10 provides a visual indicator to a vehicle operator that there is vehicle light malfunction. If a 12 VDC voltage is present on a light signal drive line then the current level should be approximately equal to the maximum level recorded during Learn mode. Thus, a malfunction is determined by detecting a lower or higher than normal current level on the vehicle light system drive lines. Light failure system 10 monitors the voltage and current levels on the Marker, Clearance, Stop, Left Turn, and Right Turn light signal drive lines (Light Drive Circuits 1-5) to detect the presence of a light system failure. Thus, Light failure detection system 10 continuously monitors the voltage and current levels on all 5 circuits and looks for low or high current levels on those circuits that are energized. The current levels are compared against threshold levels that are established during the Learn mode. In order to determine the status, an operator flips the learn switch quickly, then flips it again and holds it to trigger the module to go into a report mode where it blinks in a pattern to indicate the status. Light failure detection system 10 utilizes an algorithm for detection of Light failure conditions.

Further, Light failure detection system 10 is equipped with a microcontroller 120 for providing a variety of control functions and for storing information in an EEPROM. For example, microcontroller 120 monitors the voltage inputs 25 to determine when the each lighting circuit is active and measures the currents in the Lite Drive circuits to determine if the current levels are correct for the given input voltages. Microcontroller 120 also activates Light failure indicator switch 125 when a faulty light is detected. The Learn Mode, which monitors the voltages and currents on the lighting circuits and determines what the correct current levels are for a given circuit voltage, is also supported by microcontroller 120. Learn mode switch 85 is also monitored by microcontroller 120 to determine when an operator has activated the Learn Mode. Valid voltage and current levels, as determined by the learn mode, are also stored in non-volatile memory by microcontroller 120. In addition, microcontroller 120 also controls light out indicator 40 to indicate correct power function and to indicate when the Learn Mode is active (LED blinking). System temperatures are also monitored by microcontroller 120, which then adjusts lamp current thresholds to compensate for current changes with temperature. The system also adjusts the current thresholds based on the input voltage on each circuit.

Light failure system 10 includes software capable of system initialization and health status monitoring, light drive current and voltage measurement, current threshold calculations used to set Light failure alarms, Learn Mode Functions, Light failure Indicator Switch Control, J1708 Serial Bus Message Input/Output, LED Indicator Control, Parameter Memory management, and Temperature Sensing and current threshold adjustment.

The following table shows an example of the calculated maximum expected currents for each light drive circuit that the Light failure system 10 will be monitoring.

TABLE 1

Example Maximum Expected Current for Each Light Drive Circuit

| | | Lamp | | | | |
|---|---|---|---|---|---|---|
| | | # Lamps on | # Lamps on | # Lamps on Type | # Lamps on | # Lamps on |
| | Current Maximum (Amps) | Red Circuit "Stop" | Black Circuit Marker | Brown Circuit Clearance | Yellow Circuit Left Turn | Green Circuit Right Turn |
| ABS ECU | 7.1 | | | | | |
| Red Marker, Clearance (M/C) lamp | 0.065 | | 3 | 2 | | |
| Amber M/C lamp | 0.065 | | 2 | | | |
| Stop/Tail/Turn lamp | 0.023 | | 2 | 2 | | |
| | 0.345 | 4 | | | 1 | 1 |
| Mid-turn Lamp | 0.1 | | | 2 | | |
| | 0.6 | | | | 1 | 1 |
| Total Current | | 1.38 | 0.371 | 0.376 | 0.945 | 0.945 |

Table 1 shows an example of an expected current for each Light Drive circuit as 1.38 Amps or less. Thus, light out detection system 10 monitors a maximum of 5 Amps in order to handle any expected system growth and provide improved current monitoring resolution. For example, with a maximum 5 A draw (3.6× the expected current) the current monitoring resolution is 5 A/4096 Counts=1.22 mA/count. This resolution is adequate to successfully monitor current levels in each Light Drive circuit and detect failed lamps. An additional 7.1 A shows on the Red Stop circuit since the RED circuit goes to the ABS ECU. This is a temporary (10 seconds or less) 7.1 A current flow. The Light failure system may indicate a fault during the time when this extra current is being drawn, which is acceptable system behavior. The system monitors a failed light condition up to 5 Amps per circuit, with a maximum per circuit of 15 Amps. Between 5 A and 15 A the effectivity of the system to monitor for a failed lamp decreases as the current increases.

The current thresholds used to determine the presence of a failed lamp are approximately 50% or less of the nominal current drawn of the lowest current lamp on the circuit. The current thresholds are defined as follows:

TABLE 2

| | |
|---|---|
| Circuit 1 (Red - Stop) | 100 mA |
| Circuit 2 (Black - Marker) | 8 mA |
| Circuit 3 (Brown - Clearance) | 8 mA |

TABLE 2-continued

| | |
|---|---|
| Circuit 4 (Yellow - Left Turn) | 100 mA |
| Circuit 5 (Green - Right Turn) | 100 mA |

The thresholds shown in Table 2 are the current variations (i.e. reductions or increases) allowed on an energized circuit before a fault is declared.

The current level on each of the circuits is dependent on which other circuits are energized since many of the lamps are driven by two different light circuits and share common circuitry. This common circuitry makes the current level on any circuit dependent on which other circuits are energized. The combinations of energized circuits shown in Table 3 are monitored in order to account for this dependency. Each row in the table is a combination of energized circuits.

TABLE 3

Circuits Energized

| | | | |
|---|---|---|---|
| Circuit 1 | | | |
| Circuit 1 | Circuit 2 | | |
| Circuit 1 | Circuit 3 | | |
| Circuit 1 | Circuit 4 | | |
| Circuit 1 | Circuit 5 | | |
| Circuit 1 | Circuit 2 | Circuit 3 | |
| Circuit 1 | Circuit 2 | Circuit 4 | |
| Circuit 1 | Circuit 2 | Circuit 5 | |
| Circuit 1 | Circuit 3 | Circuit 4 | |
| Circuit 1 | Circuit 3 | Circuit 5 | |
| Circuit 1 | Circuit 4 | Circuit 5 | |
| Circuit 1 | Circuit 2 | Circuit 3 | Circuit 4 |
| Circuit 1 | Circuit 2 | Circuit 3 | Circuit 5 |
| Circuit 1 | Circuit 2 | Circuit 4 | Circuit 5 |
| Circuit 1 | Circuit 3 | Circuit 4 | Circuit 5 |
| Circuit 1 | Circuit 2 | Circuit 3 | Circuit 4 | Circuit 5 |
| Circuit 2 | | | |
| Circuit 2 | Circuit 3 | | |
| Circuit 2 | Circuit 4 | | |
| Circuit 2 | Circuit 5 | | |
| Circuit 2 | Circuit 3 | Circuit 4 | |
| Circuit 2 | Circuit 3 | Circuit 5 | |
| Circuit 2 | Circuit 4 | Circuit 5 | |
| Circuit 2 | Circuit 3 | Circuit 4 | Circuit 5 |
| Circuit 3 | | | |
| Circuit 3 | Circuit 4 | | |
| Circuit 3 | Circuit 5 | | |
| Circuit 3 | Circuit 4 | Circuit 5 | |
| Circuit 4 | | | |
| Circuit 4 | Circuit 5 | | |
| Circuit 5 | | | |

Table 4 illustrates baseline currents and current drops due to multiple circuits being simultaneously energized with reference to the system outlined in Table 1.

TABLE 4

| Circuit Current (With other Circuits Energized) | Measured Current (mA) | Delta (mA) |
|---|---|---|
| C1 (none) | 414.0 | |
| C1 (C2) | 411.9 | 2.1 |
| C1 (C3) | 407.4 | 6.6 |
| C1 (C4) | 411.4 | 2.6 |
| C1 (C5) | 411.4 | 2.6 |
| C1 (C2 & C3) | 406.1 | 7.9 |
| C1 (C2 & C4) | 409.3 | 4.7 |
| C1 (C3 & C4) | 405.5 | 8.5 |
| C1 (C2 & C3 & C4) | 404.0 | 10.0 |
| C1 (C2 & C3 & C5) | 404.3 | 9.7 |
| C1 (C2 & C3 & C4 & C5) | 402.3 | 11.7 |
| C2 (none) | 307.9 | |
| C2 (C1) | 306.5 | 1.4 |
| C2 (C3) | 307.2 | 0.7 |
| C2 (C4) | 291.6 | 16.3 |
| C2 (C5) | 291.5 | 16.4 |
| C2 (C1 & C4) | 290.5 | 17.4 |
| C2 (C1 & C3 & C4) | 290.0 | 17.9 |
| C2 (C1 & C3 & C4 & C5) | 274.0 | 33.9 |
| C3 (none) | 277.9 | |
| C3 (C1) | 245.6 | 32.3 |
| C3 (C2) | 277.0 | 0.9 |
| C3 (C4) | 206.3 | 71.6 |
| C3 (C5) | 206.3 | 71.6 |
| C3 (C4 & C5) | 134.8 | 143.1 |
| C3 (C1 & C4 & C5) | 114.3 | 163.6 |
| C3 (C1 & C2 & C4 & C5) | 117.3 | 160.6 |
| C4 (none) | 441.7 | |
| C4 (C1) | 439.0 | 2.7 |
| C4 (C2) | 437.6 | 4.1 |
| C4 (C3) | 398.8 | 42.9 |
| C4 (C5) | 437.6 | 4.1 |
| C4 (C1 & C5) | 434.5 | 7.2 |
| C4 (C1 & C2 & C5) | 430.4 | 11.3 |
| C4 (C1 & C2 & C3 & C5) | 388.9 | 52.8 |
| C5 (none) | 449.2 | |
| C5 (C1) | 446.3 | 2.9 |
| C5 (C2) | 444.8 | 4.4 |
| C5 (C3) | 406.0 | 43.2 |
| C5 (C4) | 446.5 | 2.7 |
| C5 (C1 & C2) | 442.1 | 7.1 |
| C5 (C1 & C2 & C4) | 439.4 | 9.8 |
| C5 (C1 & C2 & C3 & C4) | 398.4 | 50.8 |

LED Status indicator light 40 is configured to alert an operator of the status of light out detection system 10. For example, if LED Status indicator light 40 is OFF at power up then the threshold values have not been set. If LED Status indicator light 40 is OFF after completing a Learn Mode, then all of the thresholds have not been set and the Learn mode must be repeated. All 15 combinations of circuit activation must be implemented to complete the Learn mode. If LED Status indicator light 40 is ON, without blinking, then all thresholds are set, Power is on, and No faults are present. Fault conditions are indicated by the following blink patterns: 1 Blink: Fault on Circuit 1; 2 Blinks: Fault on Circuit 2; 3 Blinks: Fault on Circuit 3; 4 Blinks: Fault on Circuit 4; and 5 Blinks: Fault on Circuit 5.

Figure 6:
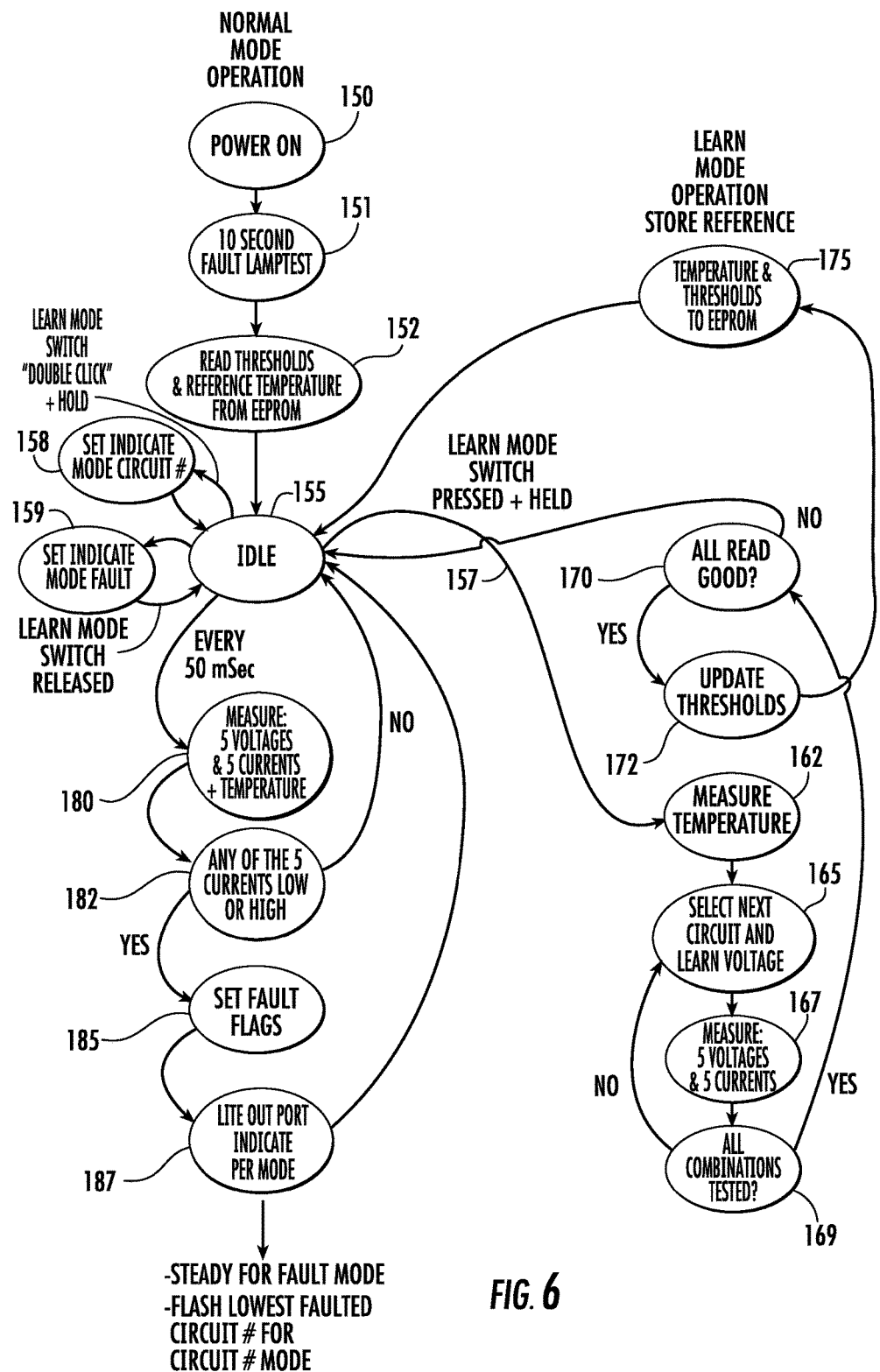
FIG. 6 is a flow diagram of normal and learn modes of the light failure detection system.

FIG. 6 illustrates a flow diagram of Normal and Learn modes of operation of light out detection system 10. Initially, a power on button or switch is activated as indicated at 150 and a 10 second fault lamp test is performed as indicated at 151. Stored threshold values and reference temperatures are then read from the non-volatile memory in the microprocessor (EEPROM) as shown at 152. The system then transitions into an idle state as indicated at 155. From idle state 155 a learn mode switch may be triggered by pressing and holding the learn mode switch as shown at 157. Alternatively, the learn mode switch may be double clicked and held in order to set a mode circuit number as shown in 158 or to set a mode fault as shown at 159. If the switch is pressed and held to trigger the learn mode 157, the system initially measures the temperature 162. The next circuit and learn mode voltage is then selected as indicated at 165. The current and voltage is then measured for each of the five circuits in 167. If all combinations have not been tested, as inquired in step 169, the system again performs step 167 of measuring the current and voltages for each circuit. If it is determined that all combinations have been tested, the system determines if all reads are acceptable in step 170. If all reads are acceptable, the threshold and temperatures are updated as indicated in step 172. The system then transitions to Normal Mode and the observed current levels (thresholds) are stored in non-volatile memory in the microcontroller in step 175. In one embodiment, during Learn Mode the system monitors the voltage level on the 5 light circuits and stores these Calibration Voltage levels in Non-volatile memory. The system then transitions into an idle state as shown in 155. If all reads are not acceptable in step 170, then the system transitions to idle state 155. The system will create a rapid flash on the fault lamp indicating a failed learn mode. It will remain in this state until the Learn Mode is reactivated and a successful learn has been achieved.

At system start the current thresholds are read from non-volatile memory in step 152 and used as the baseline "working" current levels for each circuit combination. These baseline current thresholds are adjusted as needed for changing voltage and temperature. The system transitions to idle state 155 and then measures the voltages and currents every 50 mSec as indicated in step 180. If any of the measured currents are low or high, as noted in step 182, the following steps are performed for each light circuit. Initially, it is determined which Light Circuits are energized. It is then determined which of the baseline circuit thresholds should be used. The baseline threshold is then adjusted for Voltage and temperature. The newly measured current level is then compared to the voltage/temperature adjusted threshold. If the new current measurement is lower or higher than the adjusted threshold by the amount listed in Table 2, then a fault flag is set for that circuit in step 185. The light out port is illuminated as noted in step 187.

A voltage drop circuit that can be switched on or off is coupled to the Auto-Learn circuits. The current and voltage measurements are taken at both voltages and stored. This allows the voltage sensitivity and detection threshold of each circuit to be computed directly regardless of the circuit's configuration. Temperature correction calculations are proportional to the current measured during calibration rather than additive. Further, the Learn process detects circuits that share current and change the calculations when both current sharing circuits are on at the same time. Current amplifier offsets are also measured during the Learn process. Offset corrections are applied when open circuits are detected during the Learn mode.

Different LED lamps have different configurations of LEDs, Resistors, and Diodes. Each configuration responds differently to a change in voltage. Dual brightness lamps (Stop/Tail or Mid-Turn) have additional effects that appear when both high and low brightness circuits are activated at the same time.

For example, voltage sensitivities may be as follows: Marker lamp: nominal 60 mA, sensitivity 5.5 mA/Volt; License lamp: nominal 140 mA, sensitivity 14 mA/Volt; Stop/Tail lamp, High circuit: nominal 220 mA, sensitivity 80 mA/Volt; and Stop/Tail lamp, Low circuit: nominal 43 mA, sensitivity 10 mA/Volt. The sensitivity slopes proportional to the nominal current varies due to different LED string lengths and different resistor values: i.e., Marker lamp sensitivity slope=5.5/60=0.092 mA/mA/Volt and Stop lamp sensitivity slope=80/220=0.364 mA/mA/Volt.

It has also been discovered that in a Stop/Tail lamp when a High brightness circuit is active, the current in the low brightness drops to zero. Further, in a Mid-Turn lamp, when both the high and low brightness circuits are active, the current is shared between the two circuits. The percentage split in this sharing is very sensitive to the voltage difference between the two circuits. Therefore the current in each circuit may be unpredictable. For example, a 0.1 Volt change in the low brightness circuit voltage can halve or double the current in the low circuit side of the lamp. However, the sum of the currents provided by each circuit is consistent. The affected circuits containing these types of lamps can be readily detected during calibration and have appropriate detection calculations applied.

Laboratory measurements of the voltage sensitivity of various LED lamps also showed that resistance dominates in the effects over the voltage range of 10.5 Volts to 14.5 Volts. The sensitivity is relatively constant over this voltage range. The measured variation from constant ranged from 0% to +/−6.5%. The higher percentages were present in lamps that operate at higher current and have a higher margin for error in detection of lamp out current differences.

Example lamp configurations and their resulting voltage sensitivities are as follows: Four Marker lamps and two Stop/Tail lamps on a tail circuit use 326 mA total and have a sensitivity of 42 mA/Volt. If four more Marker lamps are added to the circuit, the usage is 566 mA total with a sensitivity of 64 mA/Volt. When a License lamp is moved to the Marker circuit the usage is 706 mA total with a sensitivity of 78 mA/Volt.

The allowed difference between the measured current (C_now) and the adjusted reference current (T-adjusted threshold) is the current delta. This number is based on ¼ of the lowest current lamp used in each circuit operating at the lowest functional voltage (10.5 Volts). It is currently 8 mA for circuits incorporating single LED marker or clearance lamps and 100 mA in other circuits.

In the learn mode, thresholds and voltage sensitivities are calculated. For example, the current (C_low) and voltage (V_low) are measured at a reduced voltage. In addition, the current (C_high) and voltage (V_high) are measured at normal input voltage. The normal input is a variable that depend on the vehicle powering up the system. For example, the normal input voltage may be about 13.0 V. The reduced voltage is 0.7V lower than the normal input voltage. The measured values for C_high and V_high are used as the reference values for detection (C_ref and V_ref). The voltage sensitivity is determined by: Sensitivity=(C_high−C_low)/(V_high−V_low). For example, the sensitivity is calculated as follows: 45 mA/V=(0.564 A-0.532 A)/(13.5V−12.8V).

The process is repeated for each circuit combination. The temperature (T_ref) is also measured during the learn process. The system also detects Shared Circuits. Initially, the currents are measured for the single active circuit configurations. The currents are then measured for each two-circuit configuration. If the current for a two-circuit configuration is less than the one-circuit current by at least 15 mA for both circuits then it is determined that the circuits share current. The combination is then flagged for a "Shared Current" detection calculation.

If an active circuit combination is determined to be a shared current combination the sum of the active currents (C_now) and the sum of the adjusted C_ref currents is calculated. The sums are compared. The largest allowed current delta among the active circuits is selected and the lower limit is set to this value. If allowed current deltas are different among the active circuits then the upper limit is set to a predetermined value. For example, the upper limit may be set to 3 times the lowest current delta or another value. If the current deltas are not different among the active circuits, then the upper limit is the allowed current delta. It only applies to over current (a much more rare condition) in the circuit when shared lamps are being activated by multiple circuits. When the shared lamp is being activated by a single circuit then the regular upper limit will apply and a smaller over current will be detected.

Voltage and temperature corrections are performed to determine the adjusted reference current (T-adjusted threshold). The voltage adjusted threshold is determined as follows: V-adjusted threshold=C_ref+((V_now−V_ref)*Sensitivity). A temperature correction is then performed. Initially, a T_const (a laboratory measured value) is selected based on the active circuit and T_now greater or equal to T_ref; T_now less than T_ref and T_now greater or equal to zero degrees C.; and T_now less than T_ref and T_now less than zero degrees C. For example, T_const may be 0.002 A/A/C. The temperature adjusted threshold is calculated as follows: T-adjusted threshold=V-adjusted threshold*(1+(T_const*(T_now−T_ref))).

If C_now is less than (T-adjusted threshold−lower limit) or C_now greater than (T-adjusted threshold+upper limit) then there is a lighting circuit fault (activate fault indication). If it is a shared circuit the C_now sum, sum of T-adjusted thresholds, and modified limits are used to determine a lighting circuit fault.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A light failure detection system for use in a vehicle having a plurality of light emitting diode lighting devices, said light failure detection system comprising:
   a circuit board;
   a plurality of lighting circuits, each lighting circuit being coupled to the circuit board by an input wire;
   a plurality of voltage level monitoring circuits on said circuit board, each one of said plurality of voltage level monitoring circuits connected to one of said lighting circuits and adapted to measure the voltage (V_ref) of the one of said light circuits at an input voltage;
   a plurality of current monitoring circuits on said circuit board, each one of said plurality of current monitoring circuits connected to one of said lighting circuits and adapted to measure a current (C_ref) draw of the one of said light circuits at said input voltage;
   a voltage drop circuit for enabling the plurality of voltage level monitoring circuits and the plurality of current monitoring circuits to measure current (C_low) and voltage (V_low) at an adjusted input voltage;
   a temperature sensor;
   a learn mode switch for placing the light failure detection system into a learn mode wherein said lighting circuits are monitored with the plurality of voltage level monitoring circuits and the plurality of current monitoring circuits to determine threshold voltage and current levels for the lighting circuits;
   a microcontroller coupled to the circuit board for storing the threshold voltage and current levels and the temperature sensed by the temperature sensor, said microcontroller being adapted to calculate an adjusted threshold current based on a voltage sensitivity and the sensed temperature; and
   a fault indicator for indicating a status of the light failure detection system if a measured current C_now is above or below the adjusted threshold current by a predetermined value.

2. The light failure detection system of claim 1 further comprising a mechanical enclosure for housing the circuit board, temperature sensor, learn mode switch, and fault indicator.

3. The light failure detection system of claim 2 wherein the mechanical enclosure is filled with potting compound.

4. The light failure detection system of claim 1 further including a plurality of wire outputs fed from the plurality of lighting circuits.

5. The light failure detection system of claim 1 further including a voltage regulator for converting an input supply voltage to supply levels required by the light failure detection system.

6. The light failure detection system of claim 1, wherein the microcontroller is configured to calculate an adjusted threshold current value by first determining a voltage adjusted threshold using the formula:

$$V\text{-adjusted threshold}=C\_ref+((V\_now-V\_ref)*\text{Sensitivity}),$$

wherein the voltage sensitivity is measured using the formula:

$$\text{Sensitivity}=(C\_ref-C\_low)/(V\_ref-V\_low).$$

7. The light failure detection system of claim 6, wherein the microcontroller is further configured to adjust the V-adjusted threshold based on temperature using the formula:

$$T\text{-adjusted threshold}=V\text{-adjusted threshold}*(1+(T\_const*(T\_now-T\_ref)));$$

wherein T_const is 0.002.

8. The light failure detection system of claim 7, wherein the fault indicator light is configured to illuminate if the measured current is above or below the adjusted threshold current by a predetermined value (current delta value) includes determining if C_now is less than (T-adjusted threshold-lower limit) or if C_now is greater than (T-adjusted threshold+upper limit).

9. The light failure detection system of claim 6, wherein the system is further includes shared current lighting circuits, said system being configured to determine the presence of shared current lighting circuits by measuring the current of single active circuit configurations and then measuring the current for each two-circuit configuration, wherein a shared circuit is detected if the current for a two-circuit configuration is less than the single circuit current by at least 15 mA for both circuits.

10. The light failure detection system of claim 1, wherein if the lighting circuit is determined to be a single circuit, the upper and lower limit are a predetermined allowed current delta of the lighting circuit, and
   if the lighting circuit is determined to be a shared circuit, the lower limit is determined by calculating a sum of the active currents (C_now) and the sum of the adjusted C_ref currents for the shared circuits, comparing the C_now and the C_ref, and setting the lower limit to a largest allowed predetermined current delta among the active circuits and setting the upper limit to a predetermined value if the allowed predetermined current deltas among the active circuits are different and set to the allowed predetermined current delta among the active circuits if the allowed predetermined current deltas among the active circuits are the same.

11. The light failure detection system of claim 1, wherein the temperature sensor is coupled to the circuit board.

* * * * *